United States Patent
Yandle, II et al.

(10) Patent No.: US 8,783,280 B2
(45) Date of Patent: Jul. 22, 2014

(54) MODULAR HYDRAULIC HAMMER REDUCTION SYSTEM FOR RAILROAD TANK CARS

(75) Inventors: S. Elwood Yandle, II, New Orleans, LA (US); S. Elwood Yandle, III, Belle Chasse, LA (US)

(73) Assignee: S. Elwood Yandle, II, New Orleans, LA (US)

( * ) Notice: Subject to any disclaimer, the term of this patent is extended or adjusted under 35 U.S.C. 154(b) by 20 days.

(21) Appl. No.: 13/553,384

(22) Filed: Jul. 19, 2012

(65) Prior Publication Data

US 2013/0019981 A1 Jan. 24, 2013

Related U.S. Application Data

(60) Provisional application No. 61/509,431, filed on Jul. 19, 2011.

(51) Int. Cl.
*F16K 17/40* (2006.01)
*E03B 11/00* (2006.01)

(52) U.S. Cl.
USPC ...... 137/68.23; 137/347; 137/590; 285/139.3

(58) Field of Classification Search
USPC ................ 137/68.23, 68.11, 347, 590, 251.1; 285/139.3
See application file for complete search history.

(56) References Cited

U.S. PATENT DOCUMENTS

| | | | | |
|---|---|---|---|---|
| 1,339,083 A | * | 5/1920 | Wood-Smith | 137/385 |
| 2,247,566 A | * | 7/1941 | Walton | 137/254 |
| 2,513,450 A | * | 7/1950 | Carlisle, Sr. | 222/482 |
| 4,126,151 A | * | 11/1978 | Bullerdiek | 137/43 |
| 4,347,863 A | * | 9/1982 | Keyes | 137/212 |
| 4,840,192 A | | 6/1989 | Yandle, II | |
| 4,938,247 A | | 7/1990 | Yandle, II | |
| 5,785,078 A | | 7/1998 | Burian et al. | |
| 5,845,945 A | * | 12/1998 | Carstensen | 285/321 |
| 6,263,907 B1 | * | 7/2001 | IL-Joo | 137/471 |
| 6,382,233 B1 | | 5/2002 | Yandle, II | |
| 2009/0146418 A1 | * | 6/2009 | Noto et al. | 285/133.21 |

* cited by examiner

*Primary Examiner* — John Rivell
*Assistant Examiner* — Kevin Barss
(74) *Attorney, Agent, or Firm* — Garvey, Smith, Nehrbass & North, L.L.C.; Seth M. Nehrbass; Vanessa M. D'Souza (57) ABSTRACT

A modular hydraulic hammer reduction system for railroad tank cars includes tubular hydraulic hammer reduction devices which include means to connect the tubular devices to flanges other than by welding or being cast together. For example, the tubular devices can be press fit into the flanges, or the tubular devices can be connected to the flanges with snap rings (preferably spiral-lock snap rings), or even more preferably the tubular devices can be press fit into the flanges and the tubular devices can be connected to the flanges with snap rings (preferably spiral-lock snap rings). The advantage of this modular construction is that one can manufacture multiple tubular devices and multiple flanges of each type, and connect the flanges to the tubular devices on an as-needed basis. This is preferable to having many of each type of hydraulic hammer reduction system assembled and ready to be delivered, as the demand for different types of hydraulic hammer reduction systems varies and storing fully assembled devices will take up more space.

20 Claims, 10 Drawing Sheets

MODULAR HYDRAULIC HAMMER REDUCTION SYSTEM FOR RAILROAD TANK CARS

CROSS-REFERENCE TO RELATED APPLICATIONS

Priority of our U.S. Provisional Patent Application Ser. No. 61/509,431, filed 19 Jul. 2011, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to hydraulic hammer reduction system for railroad tank cars.

2. General Background of the Invention

Prior U.S. Pat. Nos. 4,840,192 and 4,938,247 disclose a hydraulic hammer reduction system for railroad tank cars. This original hydraulic hammer reduction system for railroad tank cars included devices which were cast as one piece or welded together (typically, they were made in two parts, the flange and the cylinder, and the flange and the cylinder were press fit together, then welded together). These are still commercially available from Industrial Pump Sales, Inc., 2814 Engineers Road, Belle Chasse, La. 70037, US. Also commercially available from Industrial Pump Sales, Inc. is a plastic hydraulic hammer reduction system described in U.S. Pat. No. 6,382,233.

U.S. Pat. No. 5,785,078 shows a safety vent for a railroad tank car which has a housing mounted about an opening on the top of the car. The housing body defines a cavity which contains a surge protector and a rupture disk.

BRIEF SUMMARY OF THE INVENTION

The present invention provides a modular hydraulic hammer reduction system for railroad tank cars. The modular hydraulic hammer reduction system for railroad tank cars includes tubular hydraulic hammer reduction devices (which can in all respects be like those shown in prior U.S. Pat. Nos. 4,840,192 and 4,938,247) which include means to connect the tubular devices to flanges other than by welding or being cast together. For example, the tubular devices can be press fit into the flanges, or the tubular devices can be connected to the flanges with snap rings (preferably spiral-lock snap rings), or even more preferably the tubular devices can be press fit into the flanges and the tubular devices can be connected to the flanges with snap rings (preferably spiral-lock snap rings). The advantage of this modular construction is that one can manufacture multiple tubular devices and multiple flanges of each type, and connect the flanges to the tubular devices on an as-needed basis. This is preferable to having many of each type of hydraulic hammer reduction system assembled and ready to be delivered, as the demand for different types of hydraulic hammer reduction systems varies and storing fully assembled devices will take up more space.

It is preferable not to weld the flange and the cylinder together, as the welding procedures are complicated, and typically add about an hour of time per completed unit compared to the new preferred system disclosed herein for joining the flange to the cylinder.

Though preferably the tubular devices are press fit into the flanges and the tubular devices are connected to the flanges with snap rings (preferably spiral-lock snap rings), other means of connecting the tubular devices to flanges other than by welding or being cast together include: threads (threading the body and the flange and screwing them together), interference fit, friction fit, dovetail (or taper fit—using a taper on the body that corresponds to a taper on the flange), slip-on fit from top of flange that would include a register in the flange and a male boss on the body, and press-fit between the body and flange secured by a product-appropriate epoxy glue.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF PREFERRED, EXEMPLARY EMBODIMENTS

Figure 2:
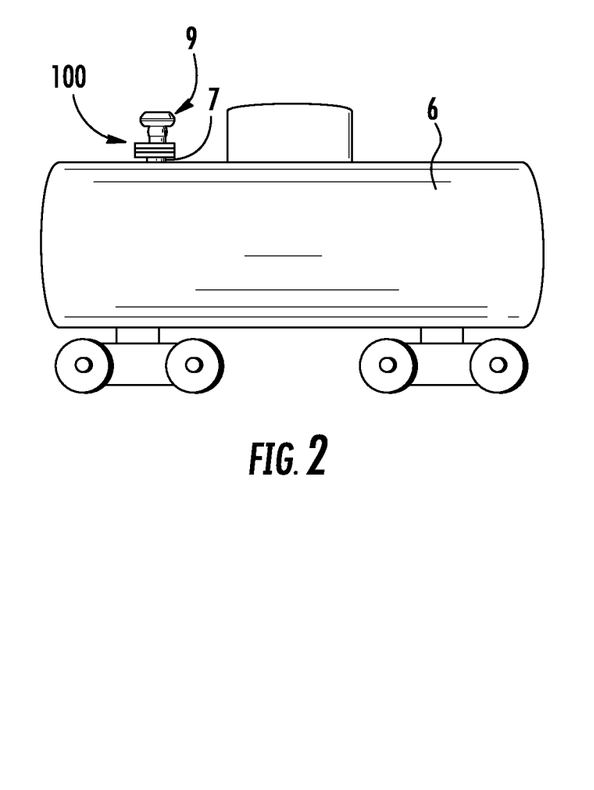
FIG. 2 is an elevation view of a common railroad tank car vehicle containing a preferred embodiment of the apparatus of the present invention.

A preferred, exemplary application of the hydraulic hammer reduction system of the present invention is railroad tank cars, an exemplary one of which is illustrated in FIG. 2. As can be seen in that figure, a rupture disk assembly 9 is included as a standard item leading into the tank 6 of the railroad car.

Figure 1:
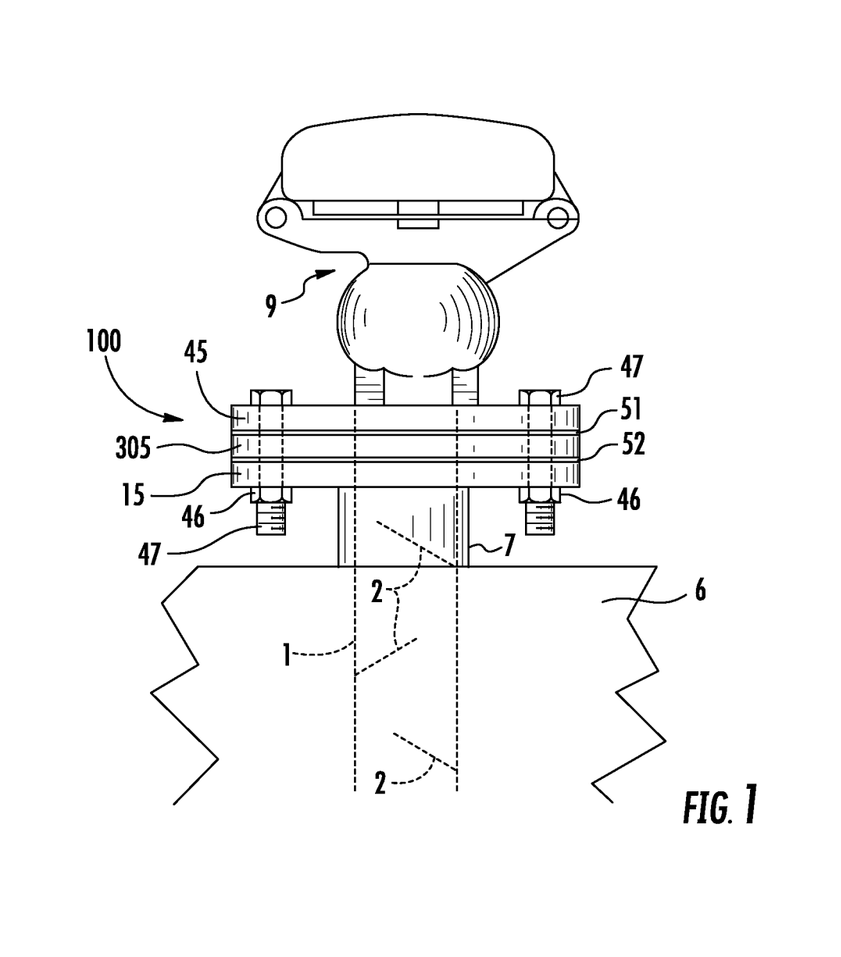
FIG. 1 is a detail of a preferred embodiment of the apparatus of the present invention.

As is known, the standard rupture disk assembly 9, such as that illustrated in FIGS. 1 & 2, is a safety device which allows a relatively small amount of the liquid load to escape by rupturing the disk in the disk assembly 9, when there is a surge in the liquid load, as for example when the tank car is brought to a sudden stop or when there is a BLEVE (boiling liquid expanding vapor explosion) due to fire. This allows part of the cargo to escape in order to save the tank itself from rupturing, causing the possible escape of the entire load, possibly greatly endangering the environment.

As is best shown in FIG. 1, a preferred, exemplary embodiment of the hydraulic hammer reduction damper 100 of the present invention includes a flange 305 for connecting it to the like plate or flange 15 of the standard nozzle attachment 7 provided for the rupture disc assembly 9 (as shown in FIG. 1). The flange plates 305, 15 comprise flat, circular plates directly or indirectly attached to and extending around but not blocking the top opening of the cylinder or basic pipe-body 1 of the damper 100. Flange plate 305 can have an outer diameter in the range of 3 to 13 inches (7.62 to 33.02 cm), for example 8 inches (20.32 cm); an inner diameter in the range of 2 to 4 inches (5.08 to 10.16 cm), for example 2 inches (5.08 cm); and a height or thickness in the range of ½ to ¾ inches (1.27 to 1.905 cm), for example ⅝ inches (1.588 cm).

Flange plate 15 can have an outer diameter in the range of 3 to 13 inches (7.62 to 33.02 cm), for example 8 inches (20.32 cm); an inner diameter in the range of 3 to 6.5 inches (7.62 to 16.51 cm), for example 8 inches (20.32 cm; and a height or thickness in the range of ½ to ¾ inches (1.27 to 1.905 cm), for example ⅝ inches (1.588 cm)cm). Standard nozzle attachment 7 can have, for example, a diameter of 3 to 6.5 inches (7.62 to 16.51 cm), for example. All of these parts in this paragraph are part of the tank car, and comprise its attachment point to the system of the present invention.

The cylinder or pipe body of the damper body 1 in the exemplary embodiment illustrated extends about ten inches below the flange 305, though it could extend about 10.25 to 10.5 inches (26.04 to 26.67 cm) below the flange 305. A pressure relief or vacuum-break port 12 (see FIG. 3) is located about 1.5 inches (3.81 cm) below the flange 305, though port 12 could be for example located about 1.15 to 1.25 inches (2.92 to 3.18 cm) below the flange 305. The pressure relief or vacuum-break port 12 (which may be better described as a "bypass port" required by Transport Canada) can have a diameter of about ½ to 1 inch (1.27 to 2.54 cm), for example 1 inch (2.54 cm).

The interior of the cylindrical pipe body 1 has affixed to it a succession or series of upwardly directed, flat baffle plates 2 on both sides, constructed of stainless steel or some other suitable material, each separately welded into place (or cast in place) at for example a 30 degree angle up from the horizontal (though the angle for example could be −45 to +45 degrees up from horizontal). Each baffle plate 2 preferably has a drain hole 11 at its lowest point (see FIGS. 10, 14, 17, 19, 22, 24, and 27). The energy dissipation or baffle plate 2 can for example be made of ⅛ to ⅜ inch (3.18 to 9.53 mm) plate spaced 1.5 to 2 inches (3.81 to 5.08 cm) apart on opposite sides of the body 1. For example, each energy dissipation or baffle plate 2 can be made of ¼ inch plate (0.64 cm) spaced 1.5 inches (3.81 cm) apart on opposite sides of the body 1. The drain hole 11 can have a diameter of ¼ to ½ inch (0.635 to 1.27 cm), for example ⅜ inch (0.9525 cm).

As can best be seen in FIGS. 1, 17, 22, & 27, each baffle plate 2 preferably extends past the center or axis line of the cylindrical pipe body 1, covering more than half of the horizontal cross-section of the body 1. The diameter of pipe body 1 could be, for example 2 to 4 inches (5.08 to 10.16 cm), and the baffle plates 2 may extend out horizontally for example 1 to 2 inches (2.54 to 5.08 cm). With an exemplary diameter of 2.375 inches (6.03 cm) for the pipe body 1, the baffle plates 2 may extend out horizontally 1.25 inches (3.18 cm), for example.

As illustrated in FIG. 1, the standard rupture disc assembly 9 (see FIG. 1) has a flange 45 which connects to the flange 305 and flange 15 with bolts 47 and nuts 46. Bolts 47 can have dimensions of ½ to ¾ inch (1.27 to 1.905 cm), for example ⅝ inch (1.588 cm). Nuts 46 can have dimensions of ½ to ¾ inch (1.27 to 1.905 cm), for example ⅝ inch (1.588 cm). Thus, dependent on the size of the nuts 46 and bolts 47, the flange bolt holes 14 can vary in diameter from ¹¹⁄₁₆ to ⅞ inch (1.746 to 2.222 cm), for example, ⅝ inch (1.588 cm). The lower end 3 of the cylinder 1, or the end further from the flange plate 5, is open and unobstructed (see FIG. 17), as is the upper end 4 of the cylinder 1; this allows fluid to flow into the lower end 3 of cylinder 1 and out of the top end 4 of cylinder 1.

When the damper 100 extends down into the tank 6 of the railroad car about 9 inches with a cylindrical body having a diameter of 2.375 inches it occupies only approximately 40 cubic inches (about 0.17 gallons-0.643 liters) of space in the tank 6, which typically has a capacity of 12,000 to 15,000 gallons (45,425 to 56,781 liters). The device 100 thus occupies less than 0.25 of a gallon (0.946 liters), which is far less than 1% of the total volume, far less than 0.1% of the total volume, less than 0.01% of the total volume and only about 0.001% of the total volume.

The measurements, materials, and angles noted herein may vary substantially depending upon the application and future design refinements.

Operation of Over-all System

As is best shown in FIG. 1, the flange 45 of the rupture disk assembly 9, the flange 305 of the damper 100, and the flange 15 of the tank car 6 are secured to one another by way of four nuts 46 and bolts 47 using the flange bolt holes 14 and a gasket 51 between flange 45 and flange 305 and a gasket 52 between flange 305 and flange 15, creating an air-tight seal. Gaskets 51 and 52 can for example be about 1/16 inch (0.159 mm) thick and be made of suitable material, such as rubber, polytetrafluoroethylene, asbestos, asbestos replacements, Garlock® brand graphite-based material, and Gylon® PTFE-based materials. Flange plate 45 can have an outer diameter in the range of 3 to 13 inches (7.62 to 33.02 cm), for example 8 inches (20.32 cm); an inner diameter in the range of 2 to 4 inches (5.08 to 10.16 cm), for example, 2 inches (5.08 cm); and a height or thickness in the range of ½ to ¾ inch (1.27 to 1.905 cm), for example 5/8 inch (1.588 cm). Gaskets 51 and 52 can have, for example, an inside diameter of 2 to 7 inches (5.08 to 17.78 cm), for example, 2 inches (5.08 cm), an outside diameter of 4¾ to 9.75 inches (12.065 to 24.765 cm), for example, 2" ID×5.125" OD (5.08 cm ID×13.017 cm OD), and a height or thickness of 1/16 to ¼ inch (0.159 to 0.635 cm), for example, 1/16 inch (0.159 cm). The open end 4 of the cylinder 1 projects into the tank car 6, the body 1 being nested within and carried by the standard nozzle 7 of the rupture disk system. Screwed onto the threads 3 of the damper 100 is the rupture disk assembly 9.

When the motion of a tank car 6 is increased or decreased abruptly, hydraulic hammer pressure is created, a force whereby the liquid inside the tank car begins to release substantial kinetic energy. The liquid at this point enters the open, lower end 3 of the hydraulic damper 100.

Figure 17:
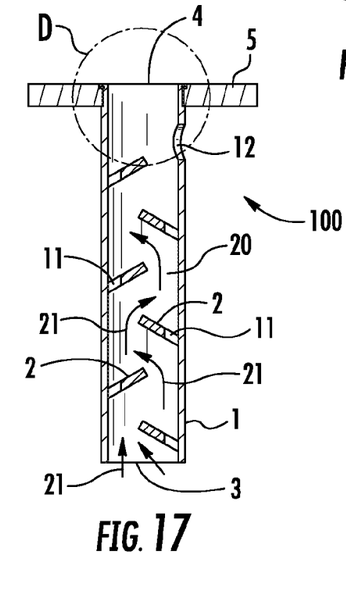
FIG. 17 is a cutaway view designated as C-C in FIG. 15 of a preferred embodiment of the apparatus of the present invention.
Figure 18:
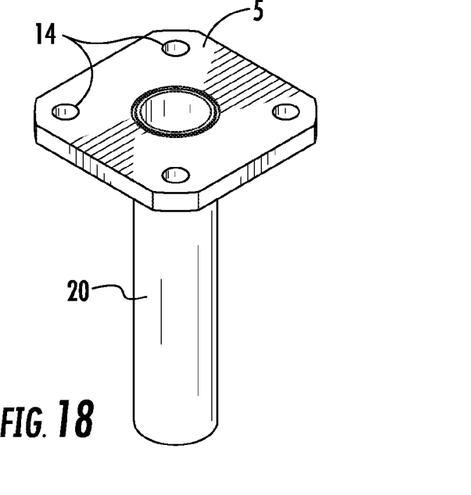
FIG. 18 is a perspective view of a preferred embodiment of the apparatus of the present invention.
Figure 19:
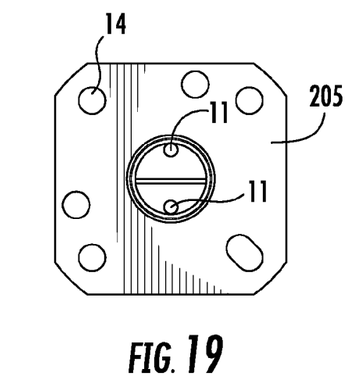
FIG. 19 is a top view of a flange of a preferred embodiment of the apparatus of the present invention.
Figure 20:
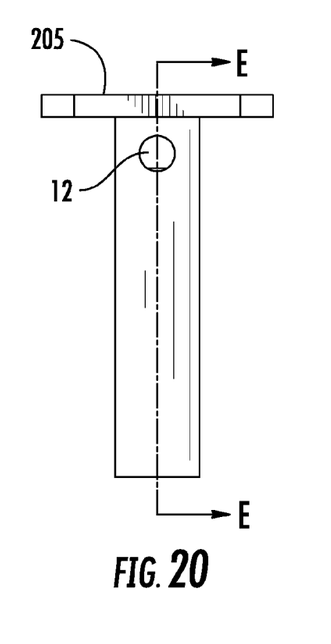
FIG. 20 is a side view of a preferred embodiment of the apparatus of the present invention.
Figure 21:
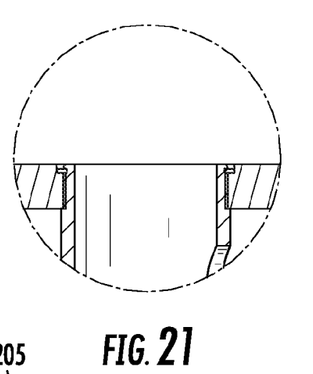
FIG. 21 is a detail designated as F in FIG. 22 of a cutaway of a preferred embodiment of the apparatus of the present invention.
Figure 22:
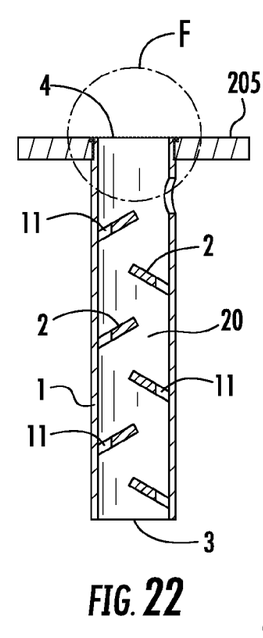
FIG. 22 is a cutaway view designated as E-E in FIG. 20 of a preferred embodiment of the apparatus of the present invention.
Figure 23:
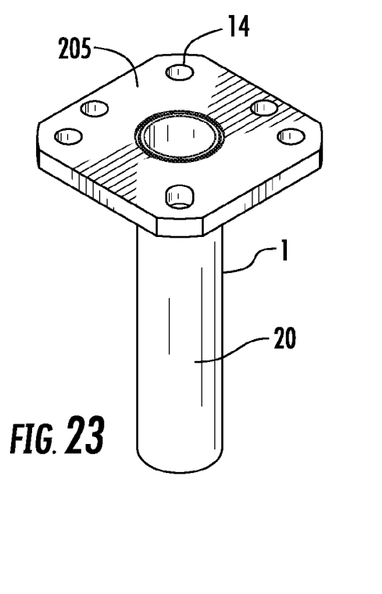
FIG. 23 is a perspective view of a preferred embodiment of the apparatus of the present invention.
Figure 24:
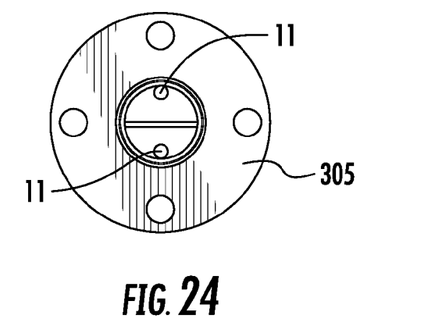
FIG. 24 is a top view of a flange of a preferred embodiment of the apparatus of the present invention.
Figure 25:
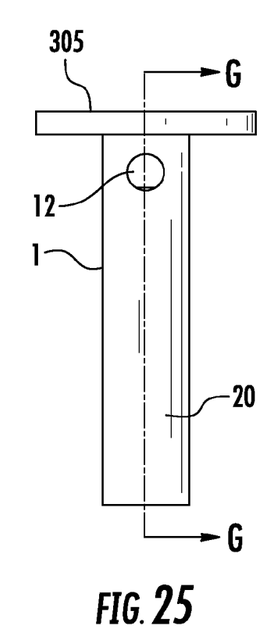
FIG. 25 is a side view of a preferred embodiment of the apparatus of the present invention.
Figure 26:
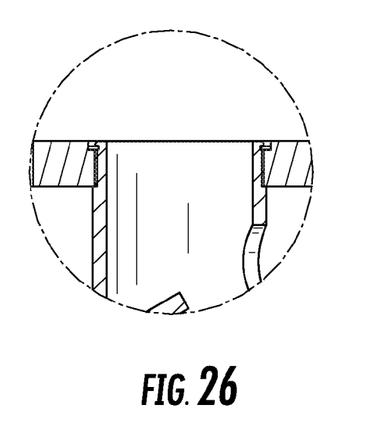
FIG. 26 is a detail designated as H in FIG. 27 of a cutaway of a preferred embodiment of the apparatus of the present invention.
Figure 27:
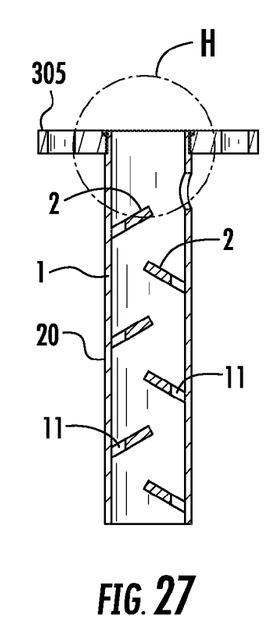
FIG. 27 is a cutaway view designated as G-G in FIG. 25 of a preferred embodiment of the apparatus of the present invention.
Figure 28:
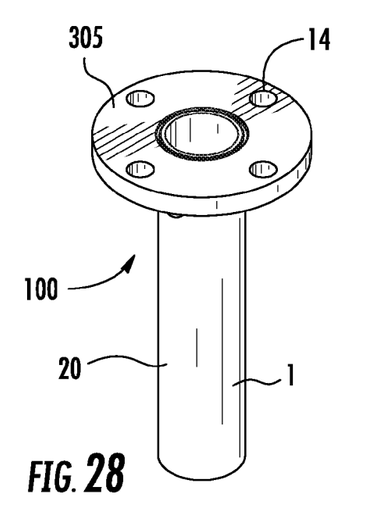
FIG. 28 is a perspective view of a preferred embodiment of the apparatus of the present invention.

As is best shown in FIG. 17, the liquid, after entering the opening 3, encounters the energy dissipating baffle plates 2, and is thereby diverted from one side of the cylinder 1 to the other (note direction arrows 21 of FIG. 17), while still being allowed to pass upwardly through the length of the damper 100 with sufficient speed and volume to prevent tank fracture pressures from occurring. Each time the liquid encounters a baffle plate 2 and is diverted from one baffle plate 2 to another, the kinetic energy of the liquid is diminished or dissipated. The pressure relief port or vacuum-break 12 allows the air initially in the cylinder 1 to be relieved or moved into the top of the tank car 6 as the liquid displaces it in its upward journey.

Ideally, by the time the liquid reaches the upper end of the hydraulic damper 100, the pressure or kinetic energy of the liquid is diminished to a pressure below the working or breaking pressure of the rupture disk (not shown) of the assembly 9, preventing its rupture. If the pressure is reduced sufficiently, the liquid will then drain back into the tank via the drain holes 11.

On the other hand, if the pressure or kinetic energy of the liquid is not reached sufficiently, that is, the pressure is still great enough to fracture the rupture disk of the assembly 9 after having passed through the damper 100, it will rupture, allowing the escape of a portion of the liquid load and relieving the excess pressure before fracturing of the tank 6 itself occurs. Thus, the ultimate fail-safe aspects of the rupture disk assembly 9 are still maintained with the present invention.

However, the presence of the damper 100 prevents rupturing of the disk in most, if not all cases, at least usually preventing the escape of any of the liquid load, which otherwise would have occurred, preventing any loss of the load and any damage to the environment.

The kinetic energy of the moving liquid load can be mechanically dissipated by many other forms and configurations of the damper of the present invention. Although the particular configuration and structure disclosed and illustrated is reliable, relatively easy to manufacture and economical, other shapes, sizes and configurations are of course possible. For example, the flow path can be made even more convoluted, openings or grates could be included, roughened surfaces or protrusions provided, varying size and configurations in cross-sections could be used as the damper is traversed, etc.

Additionally, the preferred application of the present invention is railroad tank cars, tank trucks, or other liquid load carriers and the like, in which a liquid load is being transported from one point to another in a tank, subject to abrupt changes in speed. However, the principles of the present invention can be applied to other applications, such as, for further example, a vertical turbine pump prior to or in place of a mechanical seal, etc.

Figure 3:
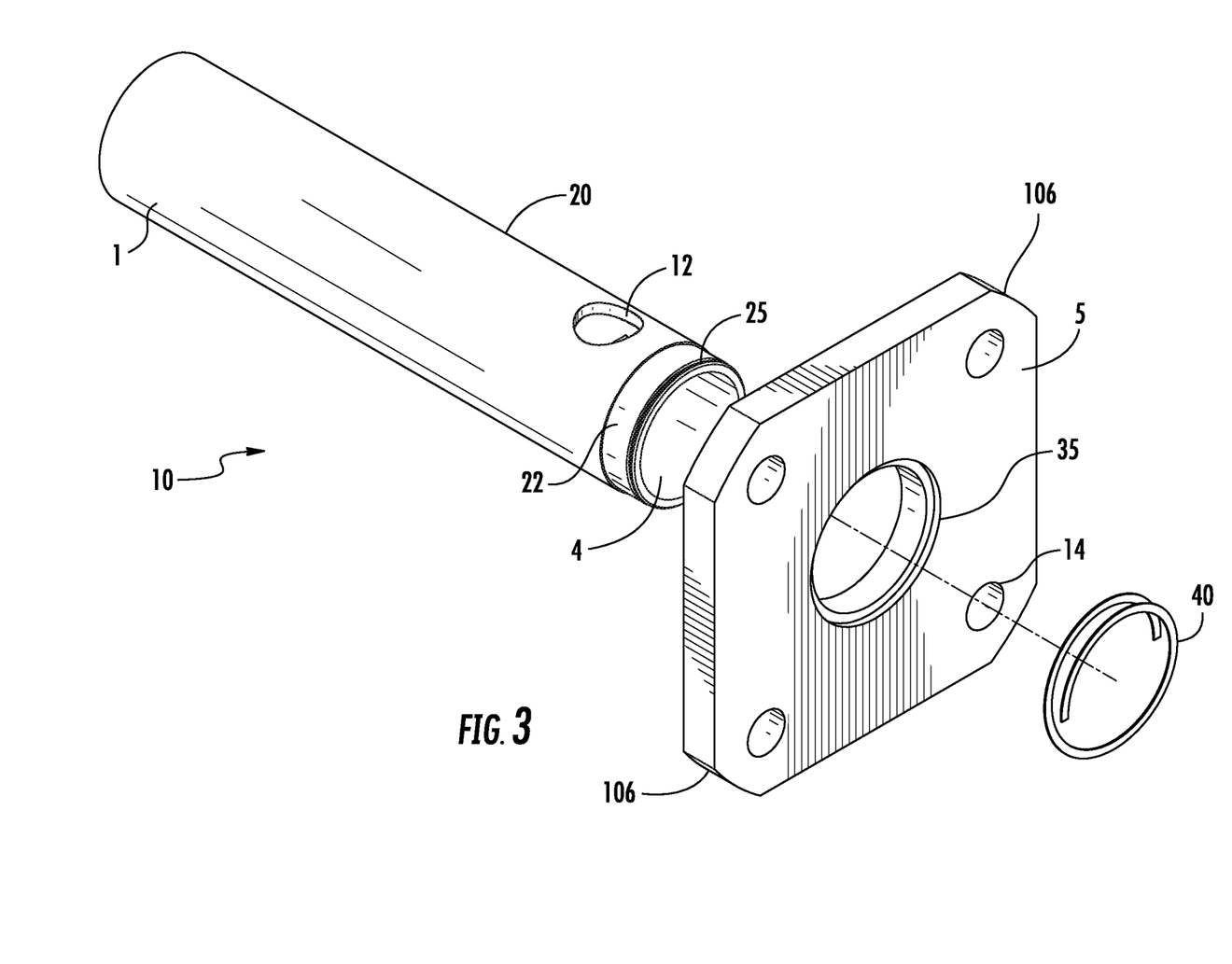
FIG. 3 is an exploded view of a preferred embodiment of the apparatus of the present invention.
Figure 4:
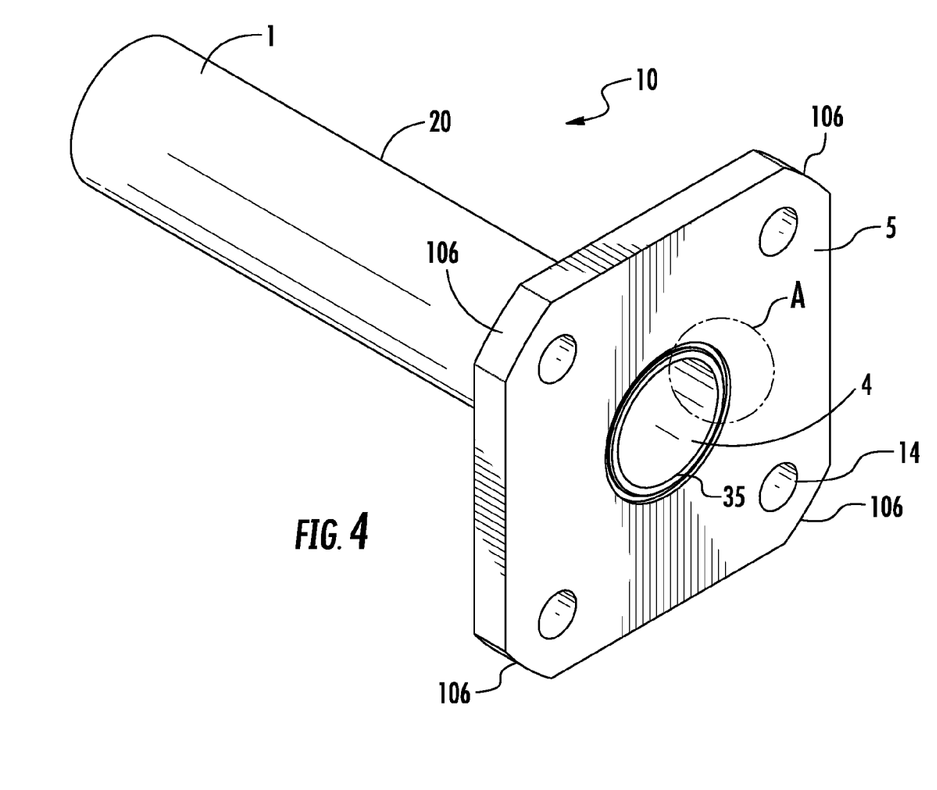
FIG. 4 is a perspective view of a preferred embodiment of the apparatus of the present invention.
Figure 5:
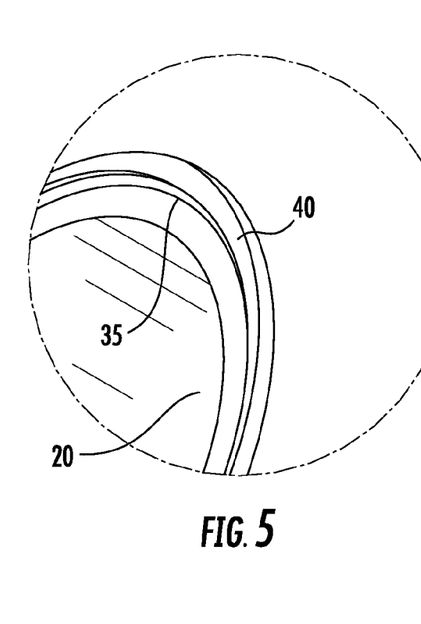
FIG. 5 is a detail designated as A in FIG. 4 showing a preferred embodiment of the apparatus of the present invention.
Figure 6:
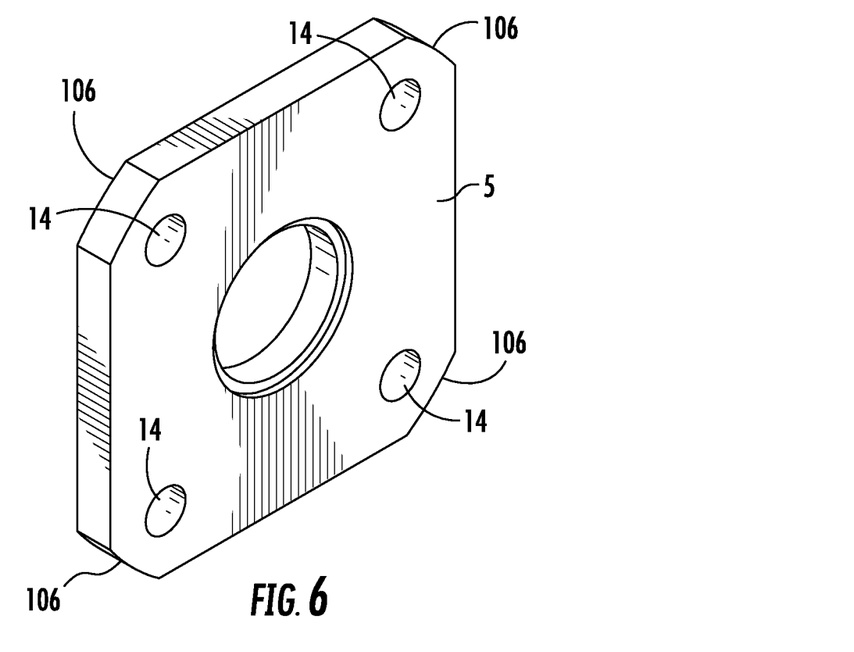
FIG. 6 shows a flange of a preferred embodiment of the apparatus of the present invention.

FIG. 3 is an exploded view of a preferred embodiment of the apparatus of the present invention, designated generally by the numeral 10. Hydraulic hammer reduction device 10 includes a flange 5, a baffle 20, and an optional spiral-lock snap-ring 40. Flange 5 (FIGS. 3, 4, and 6) includes an optional snap-ring recess 35 and flange bolt holes 14. Flange 5 is generally square but has cut-off corners 106. Flange 5 can have, a width of 6.4 to 6.6 inches (16.256 to 16.764 cm), for example, 6.5 inches (16.51 cm); an inner diameter of 2.25 to 2.375 inches (5.715 to 6.032 cm), for example, 2¼ inches (5.715 cm); and a height or thickness of ½ to ¾ inch (1.27 to 1.905 cm), for example 5/8 inch (1.588 cm). The cut-off corners 106 of flange 105 are preferably rounded to 3 to 13 inches (7.62 to 33.02 cm), for example 8" (20.32 cm).

Optional snap ring recess 35 of flange 5 can have a depth from 0.090 to 0.160 inches (0.229 to 0.406 cm), for example 0.125 inches (0.317 cm); an inner diameter of 2.31 to 2.35 inches (5.867 to 5.969 cm), for example 2.58 inches (6.553 cm); and an outer diameter of 2.58 to 2.68 inches (6.553 to 6.807 cm), for example 2.58 inches (6.553 cm). Baffle 20 includes a pressure relief/vacuum-break port 12, baffle plates 2, a reduced-outer-diameter neck 22, and an optional snapring groove 25. Reduced-outer-diameter neck 22 can have an inner diameter of 1.9 to 2 inches (4.826 to 5.08 cm), for example 2 inches (5.08 cm); an outer diameter of 2.312 to 2.315 inches (5.872 to 5.880 cm), for example, 2.312 inches (5.872 cm); and a height of 0.6 to 0.625 inch (1.524 to 1.587 cm), for example 0.625 inch (1.587 cm). Optional snap-ring groove 25 can have a depth of 0.04 to 0.06 inch (0.102 to 0.152 cm), for example 0.05 inch (0.127 cm); an inner diameter of 2.2 to 2.21 inches (5.588 to 5.613 cm), for example 2.21 inches (5.613 cm); and an outer diameter of 2.29 to 2.3 inches (5.816 to 5.842 cm), for example 2.3 inches (5.842 cm).

Optional snap-ring 40 is used to connect baffle 20 to flange 5, either by itself, or after the baffle 20 has already been press fit to flange 5. Optional snap-ring 40 can have an inner diameter of 2.23 to 2.25 inches (5.664 to 5.715 cm), for example, 2.25 inches (5.715 cm); an outer diameter of 2.5 to 2.52 inches (6.35 to 6.40 cm), for example 2.5 inches (6.35 cm); and a height of 0.060 to 0.070 inches (0.152 to 0.178 cm), for example, 0.060 inches (0.152 cm). Baffle 20 can be press fit to flange 5 without the use of the snap-ring 40.

Figure 7:
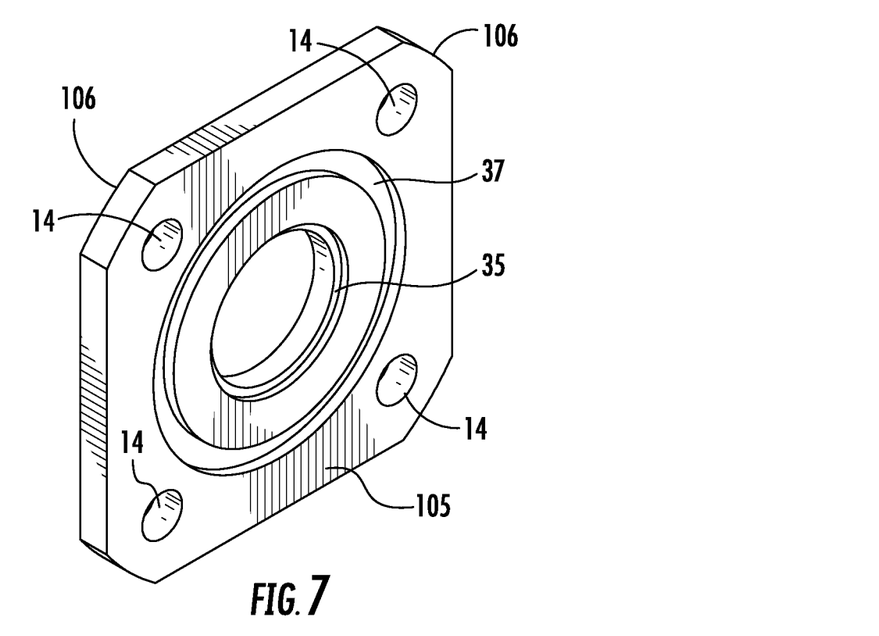
FIG. 7 shows a flange of a preferred embodiment of the apparatus of the present invention.
Figure 8:
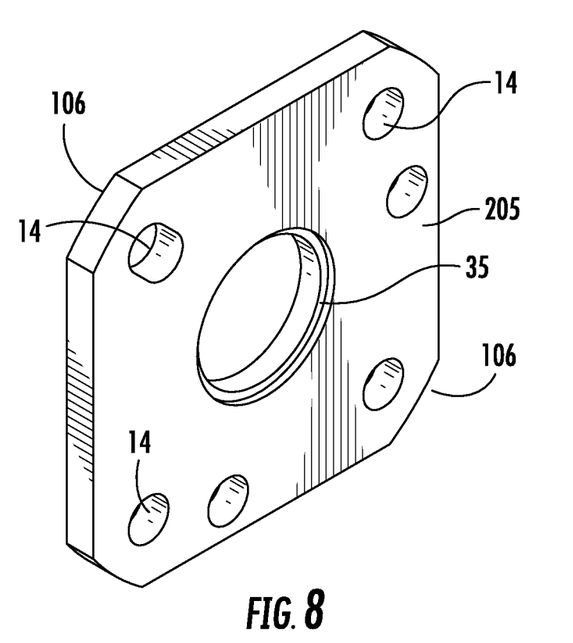
FIG. 8 shows a flange of a preferred embodiment of the apparatus of the present invention.
Figure 9:
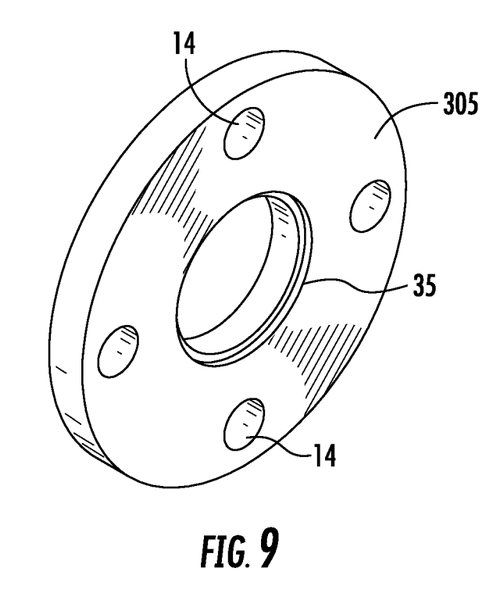
FIG. 9 shows a flange of a preferred embodiment of the apparatus of the present invention.
Figure 10:
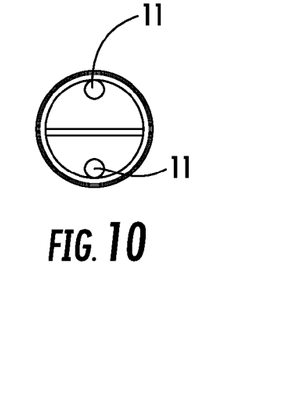
FIG. 10 is an end view of a baffle of a preferred embodiment of the apparatus of the present invention.
Figure 11:
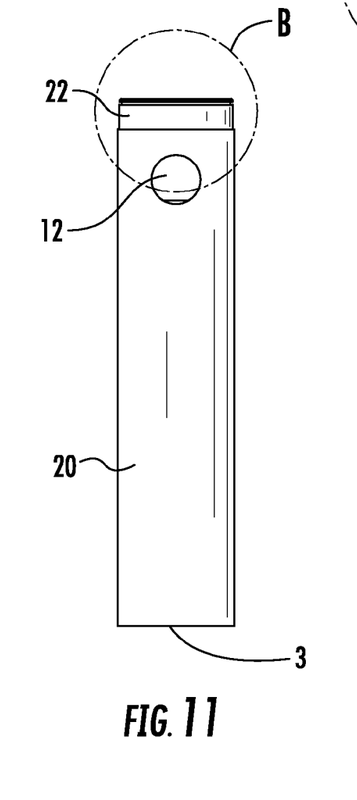
FIG. 11 is a side view of a baffle of a preferred embodiment of the apparatus of the present invention.
Figure 12:
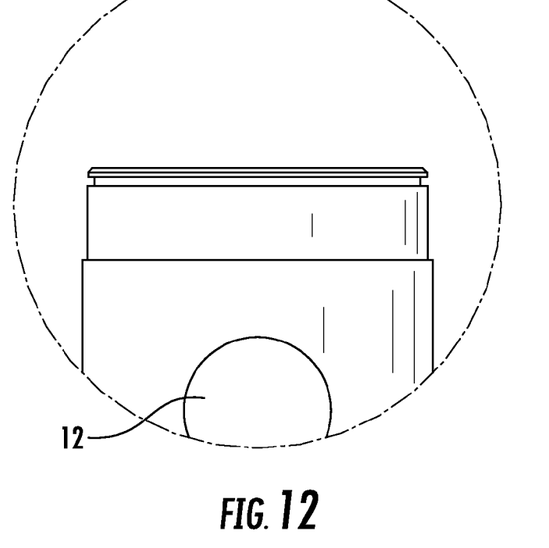
FIG. 12 is a detail designated as B in FIG. 11 of a baffle of a preferred embodiment of the apparatus of the present invention.
Figure 13:
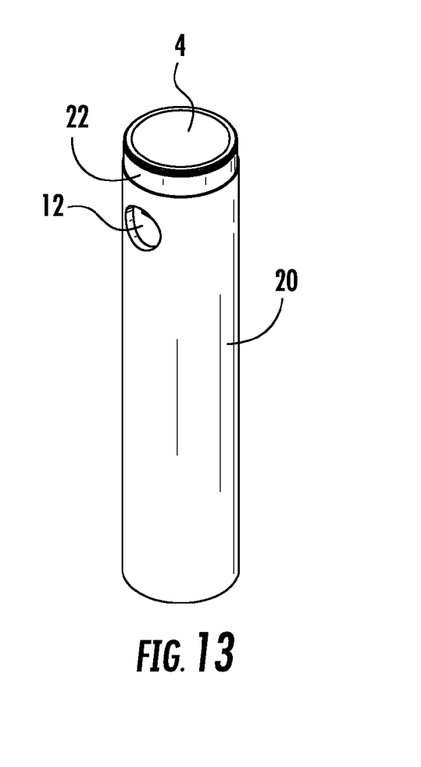
FIG. 13 is a perspective view of a baffle of a preferred embodiment of the apparatus of the present invention.
Figure 14:
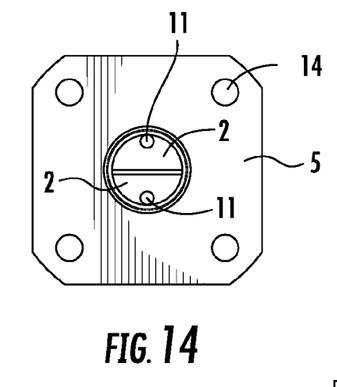
FIG. 14 is a top view of a flange of a preferred embodiment of the apparatus of the present invention.
Figure 15:
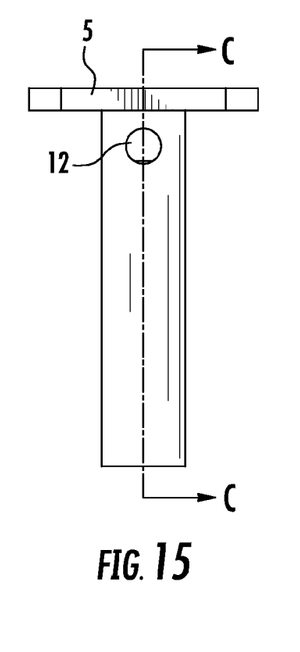
FIG. 15 is a side view of a preferred embodiment of the apparatus of the present invention.
Figure 16:
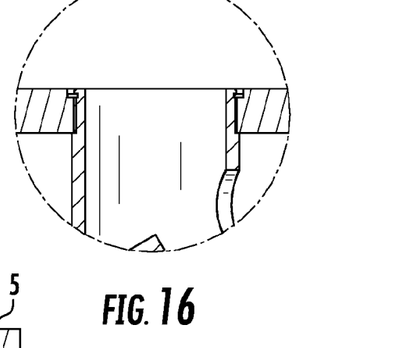
FIG. 16 is a detail designated as D in FIG. 17 of a cutaway of a preferred embodiment of the apparatus of the present invention.

Flanges 105, 205, and 305 are variations of and serve the same purpose as flange 5, and are designed to match flanges of the shapes shown. Flange 105 (FIG. 7) is generally square but has cut-off corners 106 and includes a groove 37 for receiving a rupture disk holder that is equipped with a tongue (or male register) for centering the holder. Flange 105 can have width of 6.4 to 6.6 inches (16.256 to 16.764 cm), for example, 6.5 inches (16.51 cm); an inner diameter of 2.25 to 2.375 inches (5.715 to 6.032 cm), for example, 2¼ inches (5.715 cm); and a height or thickness of ½ to ¾ inch (1.27 to 1.905 cm), for example ⅝ inch (1.588 cm). The cut-off corners 106 of flange 105 are preferably rounded to 3 to 13 inches (7.62 to 33.02 cm), for example 8" (20.32 cm). The groove 37 of flange 105 can have an inner diameter from 3.98 to 3.99 inches (10.109 to 10.135 cm), for example, 3.99 inches (10.135 cm); an outer diameter of 4.755 to 4.76 inches (12.077 to 12.090 cm), for example, 4.755 inches (12.077 cm); and a depth of 0.180 to 0.190 inches (0.457 to 0.483 cm), for example, 0.188 inches (0.478 cm). Flange 205 (FIG. 8) is also generally square and has cut-off corners 106. Flange 205 can have a width of 6.4 to 6.6 inches (16.256 to 16.764 cm), for example, 6.5 inches (16.51 cm); an inner diameter of 2.25 to 2.375 inches (5.715 to 6.032 cm), for example, 2¼ inches (5.715 cm); and a height or thickness of ½ to ¾ inches (1.27 to 1.905 cm), for example ⅝ inches (1.588 cm). The cut-off corners 106 of flange 105 are preferably rounded to 3 to 13 inches (7.62 to 33.02 cm), for example 8" (20.32 cm). Flange 205 includes an elongated hole 114 facilitating the use of both a 4-bolt 6.25" bolt circle pattern and a 3-bolt 5.5" bolt circle pattern. Elongated hole 114 can have a diameter of 0.74 to 0.76 inch (1.880 to 1.930 cm), for example, 0.75 inch (1.905 cm). Flange 305 (FIG. 9) is circular. Flange 405 (FIG. 29) is triangular.

Figure 29:
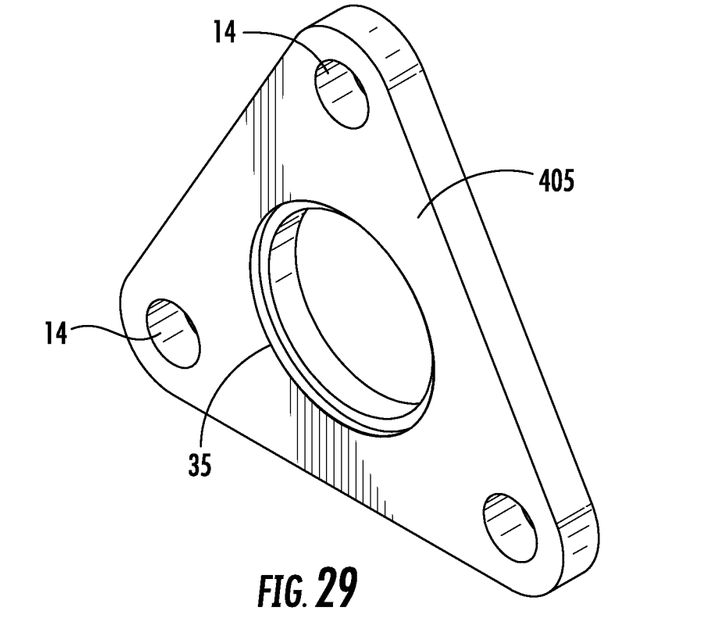
FIG. 29 shows a triangular flange of a preferred embodiment of the apparatus of the present invention.

FIG. 29 shows a triangular flange 405 of a preferred embodiment of the apparatus of the present invention. Triangular flange 405 might be used, for example, with a triangular shaped rupture disk holder.

The following is a list of parts and materials suitable for use in the present invention. Preferably, all parts of the apparatus of the present invention are made of stainless steel, and preferably 316 stainless steel, though other metals could be used. Plastic could also be used, but is not preferred. Possible plastics and other non-metal materials include Trade name plastics such as Delrin, HYD, Kynar, Pennlon, Ryton, Teflon, UHMW, Ultra Poly AR, plastic families such as acetals, cast nylons, extruded nylons, fluoropolymers, polypropylenes, polyethylenes, and polyvinylidene fluoride (PVDF).

PARTS LIST

| Part Number | Description |
|---|---|
| 1 | basic pipe body or cylinder |
| 2 | flat baffle plates |
| 3 | lower end of cylinder 1 |
| 4 | upper end of cylinder 1 |
| 5 | flange |
| 6 | tank |
| 7 | standard nozzle attachment |
| 9 | rupture disk assembly |
| 10 | hydraulic hammer reduction device |
| 11 | drain hole |
| 12 | pressure relief/vacuum-break port |
| 14 | flange bolt holes |
| 15 | flange |
| 20 | hydro damp baffle |
| 21 | direction arrows |
| 22 | neck of baffle 20 |
| 25 | snap-ring groove |
| 35 | snap-ring recess |
| 37 | groove for receiving a rupture disk holder (seen in FIG. 7) |
| 40 | spiral-lock snap-ring |
| 45 | flange of rupture disk assembly 9 |
| 46 | nut |
| 47 | bolt |
| 51 | gasket between flange 45 and flange 305 |
| 52 | gasket between flange 305 and flange 15 |

PARTS LIST -continued

| Part Number | Description |
|---|---|
| 100 | modular hydraulic damping device assembly (including rupture disk - not shown) |
| 105 | flange |
| 106 | cut-off corners |
| 114 | elongated hole |
| 205 | flange |
| 305 | flange |
| 405 | flange |

All measurements disclosed herein are at standard temperature and pressure, at sea level on Earth, unless indicated otherwise.

The foregoing embodiments are presented by way of example only; the scope of the present invention is to be limited only by the following claims.

The scope of the claims should not be limited by the preferred embodiments set forth in the examples, but should be given the broadest interpretation consistent with the description as a whole.

The invention claimed is:

1. A mechanical energy dissipation system for dissipating hydraulic hammer action in a moving tank containing a liquid load, having a rupture disk assembly for allowing some of the liquid load to escape from the tank before the tank is fractured from the hydraulic hammer action or BLEVE, comprising:
    a mechanical device of a relatively small size in comparison to the size of the tank, said device being sized and shaped to be located in the line of flow between the rupture disk of the rupture disk assembly and the liquid load, in the tank, said device when located in the line of flow presenting impact surfaces to the liquid flow from the tank to the rupture disk, dissipating the hydraulic hammer action of the liquid as it flows through said device,
    wherein said device includes a tubular body portion and a flange portion, and the tubular body portion is neither welded to the flange portion nor cast as a unitary unit with the flange portion, and wherein the tubular body portion is attached to the flange portion with a press fit and a snap ring.

2. The system of claim 1, wherein when located in the line of flow said device occupies less than and extends into less than about 1% of the interior volume of the tank.

3. The system of claim 1, wherein the tubular body portion has an interior, and the impact surfaces comprise:
    a series of baffles in succession affixed to and longitudinally spaced along opposite sides of the interior of the tubular body portion, said tubular body portion projecting into the tank and out of the tank leading to the rupture disk assembly when the device is located in the line of flow.

4. The system of claim 3, wherein said baffles are a series of flat plates affixed to the interior wall of said tubular body portion angled upwardly from the horizontal when the tubular body portion is oriented vertically.

5. The system of claim 4, wherein each of said flat plates extends and covers over at least 50% of the horizontal cross-section of said tubular body portion.

6. The system of claim 4, wherein each of said flat plates has at least one drain hole adjacent its central connection point of its attachment to said tubular body portion.

7. The apparatus of claim 1, further comprising the tank.

8. The apparatus of claim 7, wherein the tank is a railroad tank car.

9. Apparatus including a mechanical energy dissipation system for dissipating hydraulic hammer action in a moving tank containing a liquid load, having a rupture disk assembly for allowing some of the liquid load to escape from the tank before the tank is fractured from the hydraulic hammer action or BLEVE, comprising:

a mechanical device of a relatively small size in comparison to the size of the tank, said device being sized and shaped to be located in the line of flow between the rupture disk of the rupture disk assembly and the liquid load, in the tank, said device when located in the line of flow presenting impact surfaces to the liquid flow from the tank to the rupture disk, dissipating the hydraulic hammer action of the liquid as it flows through said device, wherein said device includes a tubular body portion and a flange portion, and the tubular body portion is not cast as a unitary unit with the flange portion, and the tubular body portion is attached to the flange portion with a snap ring and with a press fit.

10. The apparatus of claim 9, wherein said device when located in the line of flow occupies less than and extends into less than about 1% of the interior volume of the tank.

11. The apparatus of claim 9, wherein the tubular body portion has an interior, and the impact surfaces comprise:

a series of baffles in succession affixed to and longitudinally spaced along opposite sides of the interior of the tubular body portion, said tubular body portion projecting into the tank and out of the tank leading to the rupture disk assembly when installed in the line of flow.

12. The apparatus of claim 11, wherein said baffles are a series of flat plates affixed to the interior wall of said tubular body portion angled upwardly from the horizontal when the tubular body portion is oriented vertically.

13. The apparatus of claim 12, wherein each of said flat plates extends and covers over at least 50% of the horizontal cross-section of said tubular body portion.

14. The apparatus of claim 12, wherein each of said flat plates has at least one drain hole adjacent its central connection point of its attachment to said tubular body portion.

15. The apparatus of claim 9, further comprising the tank.

16. The apparatus of claim 15, wherein the tank is a railroad tank car.

17. Apparatus including a mechanical energy dissipation system for dissipating hydraulic hammer action in a moving tank containing a liquid load, having a rupture disk assembly for allowing some of the liquid load to escape from the tank before the tank is fractured from the hydraulic hammer action or BLEVE, comprising:

a mechanical device of a relatively small size in comparison to the size of the tank, said device being sized and shaped to be located in the line of flow between the rupture disk of the rupture disk assembly and the liquid load, in the tank, said device when located in the line of flow presenting impact surfaces to the liquid flow from the tank to the rupture disk, dissipating the hydraulic hammer action of the liquid as it flows through said device, wherein said device includes a tubular body portion and a flange portion, and the tubular body portion is attached to the flange portion with a snap ring and with a press fit.

18. The apparatus of claim 17, further comprising baffles, wherein said baffles are a series of flat plates affixed to the interior wall of said tubular body portion angled upwardly from the horizontal when the tubular body portion is oriented vertically.

19. The apparatus of claim 17, further comprising the tank.

20. The apparatus of claim 19, wherein the tank is a railroad tank car.

* * * * *